United States Patent
Pafchek et al.

(10) Patent No.: US 6,697,544 B2
(45) Date of Patent: Feb. 24, 2004

(54) TUNABLE THERMO-OPTIC DEVICE AND METHOD FOR USING

(75) Inventors: Robert M. Pafchek, Blandon, PA (US); Christopher R. Doerr, Middletown, NJ (US)

(73) Assignees: Agere Systems, Inc., Allentown, PA (US); TriQuint Technology Holding Co., Hillsboro, OR (US)

(*) Notice: Subject to any disclaimer, the term of this patent is extended or adjusted under 35 U.S.C. 154(b) by 47 days.

(21) Appl. No.: 09/911,623

(22) Filed: Jul. 25, 2001

(65) Prior Publication Data

US 2003/0021516 A1 Jan. 30, 2003

(51) Int. Cl.$^7$ ................................................ G02B 6/12
(52) U.S. Cl. ........................ 385/14; 24/27; 398/149
(58) Field of Search ............................... 385/14, 27, 39, 385/24; 359/161

(56) References Cited

U.S. PATENT DOCUMENTS

| | | | | |
|---|---|---|---|---|
| 4,223,977 A | * | 9/1980 | Papuchon | 385/14 |
| 5,351,317 A | | 9/1994 | Weber | |
| 5,436,760 A | | 7/1995 | Nakabayashi | |
| 5,519,796 A | * | 5/1996 | Li | 385/24 |
| 5,636,309 A | | 6/1997 | Henry et al. | |
| 5,745,271 A | | 4/1998 | Ford et al. | |
| 5,815,299 A | | 9/1998 | Bayart et al. | |
| 5,953,467 A | * | 9/1999 | Madsen | 385/15 |
| 5,970,201 A | | 10/1999 | Anthony et al. | |
| 6,104,526 A | | 8/2000 | Kakui | |
| 6,185,345 B1 | * | 2/2001 | Singh | 385/24 |
| 6,212,315 B1 | * | 4/2001 | Doerr | 385/31 |
| 6,333,807 B1 | * | 12/2001 | Hatayama | 359/308 |
| 2002/0076141 A1 | * | 6/2002 | Duer | 385/21 |

OTHER PUBLICATIONS

K.Inoue Et al., Tunable gain equalization using a Mach–Zehnder optical filter in multistage fiber amplifiers, IEEE Photonics Tech. Lett., 3(8), pp. 718–720(1991).*
*Dynanmic Gain Equalization in Two–Stage Fiber Amplifiers*, C.R. Giles and D. J. Di Giovanni, IEEE Photonics Technology Letters, vol. 2, No. 12, Dec. 1990.
*Tunable Gain Equalization Using a Mach–Zehnder Optical Filter in Multistage Fiber Amplifiers*, Kyo Inoue et al., IEEE Photonics Technology Letters, vol. 3, No. 8, Aug. 1991.

* cited by examiner

*Primary Examiner*—Drew Dunn
*Assistant Examiner*—Leo Boutsikaris
(74) *Attorney, Agent, or Firm*—Dickstein Shapiro Morin & Oshinsky LLP

(57) ABSTRACT

A thermo-optic device and a method for using it are described. The device has a substrate including a pair of waveguides coupled at first and second coupling regions. At the first coupling region, an input signal is split between the two waveguides. Between the coupling regions on one of the waveguides is a demultiplexer, at least one phase shifting device, and a multiplexer. The signal portions recombine at the second coupling region. Heater strips at the first and second coupling regions alter the temperature at the first and second coupling regions, in response to applied control signals, thereby adjusting the insertion loss and dynamic range of the device. A sensor samples an output signal from the substrate and sends a signal to a controller, which controls the phase shifting devices and the heater strip to maintain the output signal within predetermined signal parameters.

17 Claims, 2 Drawing Sheets

TUNABLE THERMO-OPTIC DEVICE AND METHOD FOR USING

FIELD OF THE INVENTION

The invention relates to tunable optical devices.

BACKGROUND

Fiber optic communication systems utilizing wavelength division multiplexing (WDM) are well known. Conventional WDM fiber optic communication systems include several optical components, such as multiplexers, demultiplexers, star couplers, tunable optical filters, multi-wavelength optical transmitters with tunable semiconductor lasers, wavelength routers, wavelength shifters, and opto-electronic regenerators or amplifiers.

Multiplexers are conventionally used to combine the output of several transmitters and launch that output into an optical fiber. Demultiplexers are conventionally used to split received multichannel signals into individual bands destined to different receivers. Star couplers mix the output of several transmitters and broadcast the mixed signal to multiple receivers. Tunable optical filters filter out one band at a specific wavelength to isolate that band from the multitude of other possible bands. The specific wavelength of the band can be changed by tuning a primary waveguide of the optical filter. Multiwavelength optical transmitters with tunable semiconductor lasers have a wavelength that can be tuned over a few nanometers. Wavelength routers can distribute a WDM optical signal to different ports. Wavelength shifters switch the band wavelength, and optoelectronic regenerators or amplifiers are used for boosting an optical signal.

In WDM fiber optic communication systems, broad optical signals made up of various bands are transmitted over long distances. The optical signals have a certain intensity which has to be maintained at predetermined intervals along the transmission path. This can be accomplished through the use of amplifiers set up along the transmission path. Further, each of the various bands has its own intensity, and it is often necessary to equalize, or flatten, the intensity of the various bands to prevent large differences in optical power accumulating after each of the amplifiers. One conventional method of providing amplifier gain equalization is based on controlling tunable optical filters.

Tunable optical filters have certain desired properties. One of the desired properties is a wide tuning range which maximizes the number of band selections possible. Other desirable properties include negligible crosstalk for avoiding interference from adjacent bands, fast tuning speed for minimizing access time, small insertion loss, polarization insensitivity, stability against environmental changes, and low cost. Known tunable optical filters include Fabry-Perot filters, Mach-Zehnder filters, grating-based Michelson filters, and acousto-optic filters.

Some optical filters, such as a Mach-Zehnder filter, take in a broad optical signal having a plurality of channels each with its own intensity. One portion of the optical signal is segregated off from the other and sent down a bypass path, while the other portion of the optical signal is transmitted through a primary path. The optical signal portion transmitted through the bypass path is not altered, while the optical signal portion transmitted through the primary path is separated into individual bands via a demultiplexer. Each of the separated out bands is then phase-adjusted to alter its transmissivity through the entire device. Typically, the bands are tuned by way of thermal devices, such as heaters.

After tuning the various individual bands, the bands are then all run through a multiplexer, which recombines the bands which have had their phases adjusted. The recombined signal portion differs from the original optical signal portion which was transmitted to the demultiplexer in that the intensity of each of the individual bands has been adjusted. After recombination, the primary and bypass paths are coupled at a second coupler. The recombination of the optical signal portion from the bypass path and the now altered optical signal portion from the primary path may result in certain bands being in phase, certain bands being out of phase, and thereby filtered out, and certain bands being partially in phase, and thereby partially filtered out.

The recombined and altered signal exiting from the second coupler is then transmitted along a preselected signal path to its final destination or on to another optical filter. As the recombined and altered signal exits the second coupler it is transmitted to a sensor which taps off and analyzes a small portion, such as one percent, of the signal. If the sensor detects that the recombined and altered signal is not within a predetermined range of intensity, the sensor sends a signal to a controlling element, such as a microprocessor controller, which in turn sends signals to the various heaters to adjust one or more of the heaters so as to further tune one or more bands.

A disadvantage of these tunable optical filters is that they have a fixed dynamic range and a fixed minimum insertion loss. Dynamic range is the degree to which the intensity of individual bands in an optical signal and/or the intensity of the optical signal as a whole can be adjusted. Insertion loss is the loss of power from inserting a component into an optical path. Over time, as a fiber optic communication system performance changes, the tunable optical filter sometimes cannot be adjusted enough to compensate for the performance changes due to the fixed dynamic range, and it must be exchanged for a new filter that has an appropriate dynamic range for the changed performance.

SUMMARY

The invention provides a thermo-optic device adapted to vary its dynamic range. The device includes a substrate, an input port for receiving an input signal, first and second planar waveguides situated within the substrate and adapted to receive a portion of an input signal, first and second coupling regions at which the waveguides are coupled, an output port coupled to the second coupling region, a first signal line for receiving a control signal, and a first heater strip positioned at the first coupling region. The first heater strip is responsive to a received first control signal on the signal line to alter the temperature characteristic of the first coupling region. In one aspect, a second heater strip at the second coupling region is responsive to a received second control signal on a second signal line to alter the temperature characteristic of the second coupling region. By controlling the first coupling region, and in the aforementioned one aspect, the first and second coupling regions, the dynamic range of the thermo-optic device can be altered as necessary.

The invention also provides a fiber optic communication system which includes one or more thermo-optic devices adapted to vary their dynamic range. The system includes an input signal generator for generating an input optical signal, an output receiver; and a thermo-optic device coupled between the input optical signal generator and the output receiver. The thermo-optic device includes a first heater strip positioned at a first coupling region. The first heater strip is responsive to a received first control signal on a first signal line to alter the temperature characteristic of the first coupling region and thus the dynamic range of the thermo-optic device.

The invention further provides a method for using a thermo-optic device. The method includes providing an optical signal having a plurality of multiplexed optical bands, splitting the optical signal into first and second portions which respectively travel through a first planar waveguide and a second planar waveguide, demultiplexing the first portion of the optical signal transmitted along the first planar waveguide into individualized bands, altering the phase of one or more of the individualized bands, multiplexing together the individualized bands, combining the portions of the input signal transmitted along the first and second planar waveguides to produce an output signal, and adjusting the coupling ratio of the first and second portions of the optical signal in response to the output signal.

These and other advantages and features of the invention will be more readily understood from the following detailed description of the invention which is provided in connection with the accompanying drawings.

DETAILED DESCRIPTION OF PREFERRED EMBODIMENTS

Figure 1:
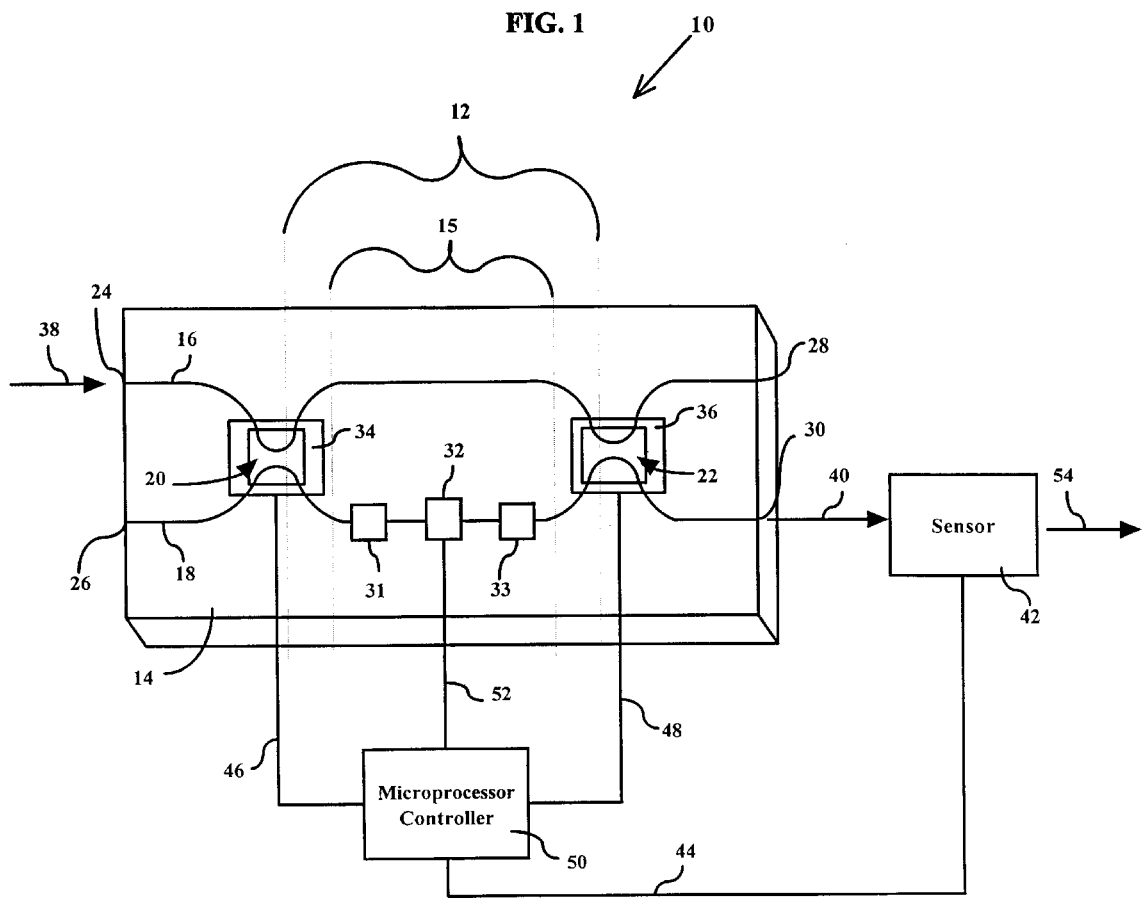
FIG. 1 is a schematic view of a tunable thermo-optical device constructed in accordance with an embodiment of the invention.

A tunable thermo-optical device 10 is illustrated in FIG. 1. The thermo-optical device 10 includes a substrate 14 which has a filter, such as a Mach-Zehnder filter 12. The substrate 14 may be formed of any suitable material, but is preferably a silicon-based material.

Traversing the substrate are a pair of optical waveguides 16, 18. A bypass waveguide 16 extends between an input port 24 and an output port 28, while a primary waveguide 18 extends between an input port 26 and an output port 30. As illustrated, although two input ports 24, 26 are shown, a multiplexed optical signal 38 only enters into the input port 24. It should be appreciated, however, that the multiplexed optical signal 40 may enter either input port 24 or 26.

The filter 12 extends between a pair of coupling regions 20, 22. Specifically, the filter 12 extends from an output of the first coupling region 20 to an input of the second coupling region 22. The first coupling region 20 is a region where the two waveguides 16, 18 move close enough to one another to allow for a portion of the signal 38 to move from the waveguide 16 to the waveguide 18, thereby creating a distribution of the signal 40 between the two waveguides 16, 18 through the filter 12. Specifically, each band of the multiplexed optical signal 38 is split at the first coupling region 20 at a predetermined coupling ratio (ratio of the amount of the signal transmitted along the bypass path 16 to the amount of the signal transmitted along the primary path 18). Each band is split according to the same coupling ratio.

The second coupling region 22 is a region where the two waveguides 16, 18 once again move close enough to one another to allow for the portion of the signal 38 moving along the waveguide 16 to move to the waveguide 18, thereby allowing a full output signal 40 from the output port 30.

Within a middle section 15 of the filter 12, a demultiplexer 31, at least one phase shifting device 32, and a multiplexer 33 are placed within the path of the primary waveguide 18 to alter the portion of the signal 40 traveling along that waveguide. The demultiplexer 31 separates the portion of the signal 38 traveling along the primary waveguide 18 into individual bands. Although only one phase shifting device 32 is shown for simplicity of illustration, it is to be appreciated that any number of phase shifting devices 32 may be incorporated into the filter 12. The number of phase shifting devices 32 is dependent upon the number of individualized bands which are to be segregated out by the demultiplexer 31.

Preferably, each phase shifting device 32 generates an electric field which affects the specific individualized band of the portion of the signal 38 traveling along the primary waveguide 18. If the phase shifting device 32 is turned off, and thereby generating no electric field, the specific individualized band travels the same optical distance as the portion of the signal traveling along the bypass waveguide 16. When a sufficiently large electric field is applied by the phase shifting device 32, the specific individualized band of the portion of the signal 38 traveling along the waveguide 18 travels a different optical distance than the portion of the signal 38 traveling along the bypass waveguide 16 and is thus phase shifted, the amount of phase shift being determined by the strength of the applied electric field.

The multiplexer 33 serves to recombine the individualized bands from the various phase shifting devices 32. If any of the devices 32 have generated an electric field, the phase of the recombined portion of the signal 38 traveling along the primary waveguide 18 has been altered relative to the phase of the same signal traveling along the bypass path 16. This recombined portion of the signal 38 traveling along the waveguide 18 may now include specific individualized bands which are completely out of phase, or partially out of phase, with counterpart individualized bands traveling along the bypass waveguide 16, therefore either completely canceling out, or filtering out, or partially filtering out that band when the signals in the waveguides 16 and 18 are recombined in the second coupling region 22.

Further, the recombined portion of the signal 38 traveling along the waveguide 18 may include specific individualized bands which are completely in phase with counterpart individualized bands traveling along the bypass waveguide 16. Thus, by altering the phases of various individualized bands to create a certain amount of out of phase or partially out of phase bands in the primary waveguide 18 relative to counterpart bands in the bypass waveguide 16, the intensity of the individual bands in the recombined output signal 40 can be modulated, which, in turn, affects the intensity of the output signal 40.

A first heater strip 34 is provided near the first coupler region 20, and a second heater strip 36 is provided near the second coupler region 22. The heater strips 34, 36 respectively serve to adjust the temperatures at the first and second coupler regions 20, 22. By having the flexibility to adjust the temperature of the waveguides 16, 18, the coupling ratio of the signal 38 can be dynamically controlled. For example, while a conventional thermo-optic device may have a coupling ratio of 50:50 at the first coupling region 20, the thermo-optic device 10 of the invention has an adjustable range of coupling ratios.

Having the flexibility to dynamically control the coupling ratio provides benefits to the thermo-optic device 10. For example, by putting a small portion of the signal 38 through the bypass waveguide 16, only a small portion of the output signal 40 is altered relative to the input optical signal 38. While a large portion of the signal 38 is passed through the primary waveguide 18, there is only a small portion of the signal 38 passed through the bypass waveguide 16 which can be canceled out by phase corrections occurring in the primary waveguide 18. Thus, having the flexibility to control the coupling ratio allows a greater portion of the signal to be transmitted to the bypass waveguide 16. In so doing, the insertion loss caused by the demultiplexer 31, phase shifting device 32, and multiplexer 33 on the primary waveguide 18 can be reduced.

The altered output signal 40 is sent to a sensor 42 which senses the intensity of each individualized band independently. A small percentage of the output signal 40 is tapped and sampled by the sensor 42. A signal representing the data from the sampling is transmitted along a communication line 44 to a microprocessor controller 50. The remainder of the output signal 40 continues through the sensor 42, exiting as an output signal 54. The signal sent to the microprocessor controller 50 is used to adjust the electric field(s) generated by the phase shifting device(s) 32.

The intensity distribution of the output signal 40 is controlled by adjustment of the phase shifting devices 32. Adjustment of each phase shifting device 32 is accomplished by sending a signal from the microprocessor controller 50 through a communication line 52 to the phase shifting device 32. When the sensor 42 measures a sufficiently large difference in intensity for a band, it sends a signal to the microprocessor controller 50 to alter the current in a particular phase shifting device 32 either up or down. While only one communication line 52 is shown, it is to be understood that there are as many communication lines 52 as there are phase shifting devices 32.

The heater strips 34, 36 are adjusted to balance the insertion loss and the dynamic range of the thermo-optic device 10. A signal sent to the microprocessor controller 50 is used to adjust the heater strip 34 through a communication line 46, thereby allowing an adjustment of the coupling ratio, and thereby the performance of the fiber optic communication system. A similar signal is sent from the microprocessor controller 50 to the heater strip 36 via a communication line 48. The adjustment of the heater strips 34, 36 should be done in unison such that if, for example, the coupling ratio at the first coupling region 20 is A/(100–A), then the coupling ratio at the second coupling region 22 should be (100–A)/A. For example, if A is 30, then the coupling ratio at the first coupling region 20 would be 30/70 and the coupling ratio at the second coupling region 22 should be 70/30.

By way of example, the sensor 42 samples the intensity of the output signal 40 and sends a signal to the microprocessor controller 50 indicating that the intensity of the output signal 40 is above or below predetermined normal operating parameters. The signal, or a separate signal, to the microprocessor controller 50 further indicates that the insertion loss is too high. The microprocessor controller 50 in turn sends signals along the communication lines 52, 46 and 48 to, respectively, alter the phase of various individualized bands (by adjusting one or more phase shifting devices 32) and to alter the coupling ratio (by adjusting the heater strips 34 and 36). By adjusting the amount of the signal passing through the primary waveguide 18, the insertion loss of the thermo-optic device 10 can be altered. Preferably, both the heater strips 34 and 36 should be adjusted in unison, as adjusting only one heater strip may add excess power loss to the output sampled signal 54.

The thermo-optic device 10 illustrated in FIG. 1 is capable of varying the dynamic range, and hence the insertion loss, by adjusting the ratio of the signal portion passing through a bypass waveguide relative to the signal portion passing through a primary waveguide.

Figure 2:
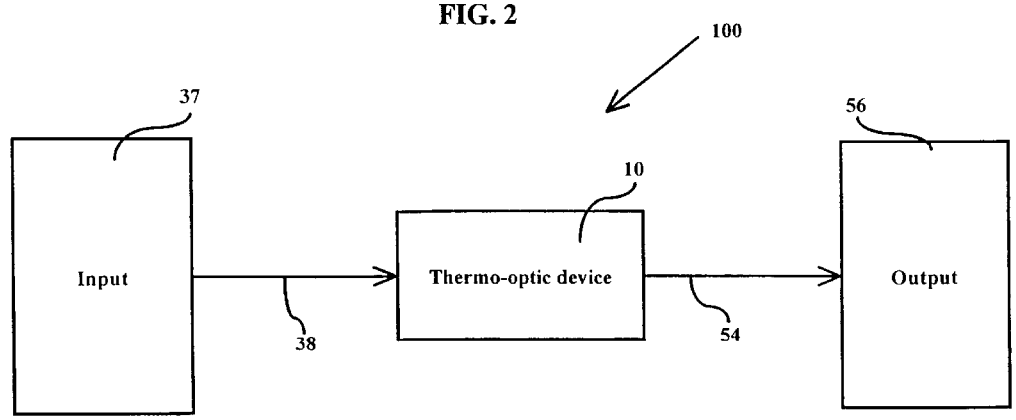
FIG. 2 is a schematic view of a fiber optic system including the tunable thermo-optical device of FIG. 1.

With reference to FIG. 2, a fiber optic communication system 100 is schematically shown. The system 100 includes a signal input generator or source 37 which generates and delivers the signal 38 to the thermo-optic device 10. The thermo-optic device 10 delivers the output sampled signal 54 to an output destination, or receiver, 56. Through appropriate adjustment of the heater strip 34 and the phase shifting devices 32 (FIG. 1), the output signal 54 is properly and dynamically modulated to adjust to changing system parameters.

Figure 3:
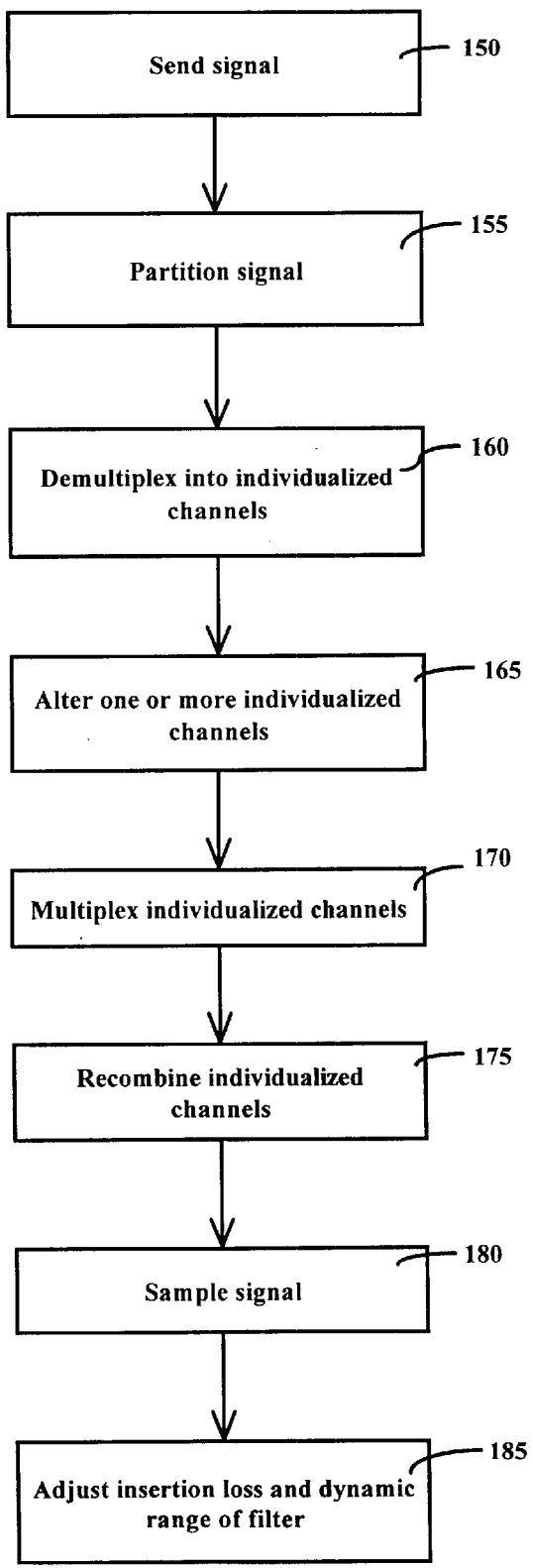
FIG. 3 is a flow diagram of steps for adjusting dynamic range and insertion loss of a tunable thermo-optical device constructed in accordance with an embodiment of the invention.

FIG. 3 illustrates a flow diagram of steps for using the thermo-optic device 10. At step 150, an input signal, such as the input signal 38 is transmitted through the thermo-optic filter 10. Portions of the signal 38 are partitioned, at the first coupling region 20, between the pair of waveguides 16, 18 at step 155. The portion of the signal 38 transmitted along the primary waveguide 18 is demultiplexed into individualized bands at step 160. At this point, optionally one or more of the individualized bands may be altered through the use of a phase shifting device 32 at step 165. Whether a band is altered, and which band is altered, are determined by a sensor which measures the intensities of the individualized bands and sends a signal to a microprocessor controller which in turn adjusts appropriate phase shifting devices to alter the phases of one or more bands.

The individualized bands are then multiplexed at step 170 and recombined at the second coupling region 22 at step 175. At this point in the process, the primary waveguide 18 includes one or more bands with their phases altered which are multiplexed together. At step 180, the output signal 40 is sampled at the sensor 42. Based upon a predetermined set of parameters desired for the output signal 40, a signal is transmitted to the microprocessor controller 50 which makes a determination to adjust one or more of the phase shifting devices 32 and/or the heater strips 34, 36 at step 185. The adjustment of the phase shifting devices 32 serve to adjust the phase of one or more individualized bands of the signal portion transmitted along the primary waveguide 18 relative to a counterpart band of the portion of the signal 38 transmitted along the bypass waveguide 16. The adjustment of the heater strips 34, 36 serves to adjust the ratio of signals in the waveguides 16 and 18 and thus the insertion loss and dynamic range of the thermo-optic device 10 as a whole, thereby rendering the device 10 more accommodating to a wide range of applications.

While the foregoing has described in detail an exemplary embodiment of the invention, it should be readily understood that the invention is not limited to the disclosed embodiment. Rather the invention can be modified to incorporate any number of variations, alterations, substitutions or equivalent arrangements not heretofore described, but which are commensurate with the spirit and scope of the invention. For example, while the invention has been described and illustrated using thermo-optic control, it is to be appreciated that electro-optic control may instead be utilized with the invention. Accordingly, the invention is not to be seen as limited by the foregoing description, but is only limited by the scope of the appended claims.

What is claimed as new and desired to be protected by Letters Patent of the United States is:

1. A thermo-optic device, comprising:
   a substrate;
   an input port for receiving an input signal;
   first and second planar waveguides positioned with said substrate, said waveguides adapted to receive a portion of said input signal;
   first and second coupling regions at which said waveguides are coupled, said first coupling region receiving an input signal from said input port;
   an output port coupled to said second coupling region;
   a first signal line for receiving a first control signal;
   a first heater strip positioned at said first coupling region, wherein said first heater strip is responsive to a received first control signal on said first signal line to alter the temperature characteristic of said first coupling region and to alter the ratio of said input signal present in said first and second planar waveguides;
   a second signal line for receiving a second control signal;
   a second heater strip positioned at said second coupling region, said second heater strip being responsive to a received second control signal on said second signal line to alter the temperature characteristic of said second coupling region, and to alter the ratio of said input signal present in said first and second planar waveguides, wherein said first and second heater strips alter the dynamic range and the insertion loss of the device;
   a demultiplexer to separate said input signal in said first planar waveguide into individualized bands;
   at least one phase shifting device for shifting the phase of at least one of said individualized bands of said input signal in said first planar waveguide; and
   a multiplexer to integrate said individualized bands of said input signal in said first planar waveguide.

2. The thermo-optic device of claim 1, wherein said second coupling region combines the portions of said input signal which are in said first and second planar waveguides into an output signal available at said output port.

3. The thermo-optic device of claim 2, further comprising a sensor to sense and sample the intensity of said output signal.

4. The thermo-optic device of claim 3, further comprising a controller electrically connected with said sensor to receive a signal from said sensor and to transmit a control signal to at least one said heater strip.

5. The thermo-optic device of claim 4, wherein said controller transmits a control signal to at least one of said phase adjusting devices.

6. A fiber optic communication system, comprising:
   an input signal generator for generating an input optical signal;
   an output receiver; and
   a thermo-optic device coupled between said input optical signal generator and said output receiver, said thermo-optic device including:
   a substrate;
   an input port for receiving an input signal;
   first and second planar waveguides positioned with said substrate, said waveguides adapted to receive a portion of said input signal;
   first and second coupling regions at which said waveguides are coupled, said first coupling region receiving an input signal from said input port;
   an output port coupled to said second coupling region;
   a first signal line for receiving a control signal;
   a first heater strip positioned at said first coupling region, wherein said first heater strip is responsive to a received control signal on said first signal line to alter the temperature characteristic of said first coupling region and to alter the ratio of said input signal present in said first and second planar waveguides;
   a second signal line for receiving a second control signal;
   a second heater strip positioned at said second coupling region, said second heater strip being responsive to a received second control signal on said second signal line to alter the temperature characteristic of said second coupling region and to alter the ratio of said input signal present in said first and second planar waveguides, wherein said first and second heater strips alter the dynamic range and the insertion loss of the device;
   a demultiplexer to separate said input signal in said first planar waveguide into individualized bands;
   at least one phase shifting device for shifting the phase of at least one of said individualized bands of said input signal in said first planar waveguide; and
   a multiplexer to integrate said individualized bands of said input signal in said first planar waveguide.

7. The system of claim 6, wherein said second coupling region combines the portions of said input signal which are in said first and second planar waveguides into an output signal available at said output port.

8. The system of claim 7, wherein said thermo-optic device further comprises a sensor to sense and sample the intensity of said output signal available at said output port.

9. The system of claim 8, further comprising a controller electrically connected with said sensor to receive a signal from said sensor and to transmit a signal to at least one of said heater strips.

10. The system of claim 9, wherein said controller transmits a signal to at least one of said phase adjusting devices.

11. A method of adjusting optical signals, comprising:
    providing an optical signal having a plurality of multiplexed optical bands;
    splitting the optical signal into first and second portions which respectively travel through a first planar waveguide and a second planar waveguide;
    demultiplexing the first portion of the optical signal transmitted along the first planar waveguide into individualized bands;
    altering the phase of one or more of said individualized bands;
    multiplexing together the individualized bands, one or more of which have been phase altered, and passing the multiplexed bands along the first planar waveguide;
    combining the portions of the input signal transmitted along the first and second planar waveguides to produce an output signal;
    sensing the output signal; and
    adjusting the coupling ratio of the first and second portions of the optical signal in response to the output signal.

12. The method of claim 11, wherein said adjusting comprises adjusting the phase of one or more of said individualized bands.

13. The method of claim 11, wherein said sensing includes sampling the intensity of the output signal.

14. The method of claim 11, wherein said adjusting of the phase of one or more individualized bands includes altering the optical distance traveled by one or more of said individualized bands of the first portion of the optical signal.

15. The method of claim 11, wherein said adjusting of the coupling ratio of the first and second portions of the optical signal includes adjusting the temperature at the first coupling region.

16. The method of claim 15, wherein said adjusting of the coupling ratio of the first and second portions of the optical signal includes adjusting the temperature at the second coupling region.

17. The method of claim 16, wherein said adjusting of the temperatures at the first and second coupling regions is done in unison.

* * * * *